Figure 1:
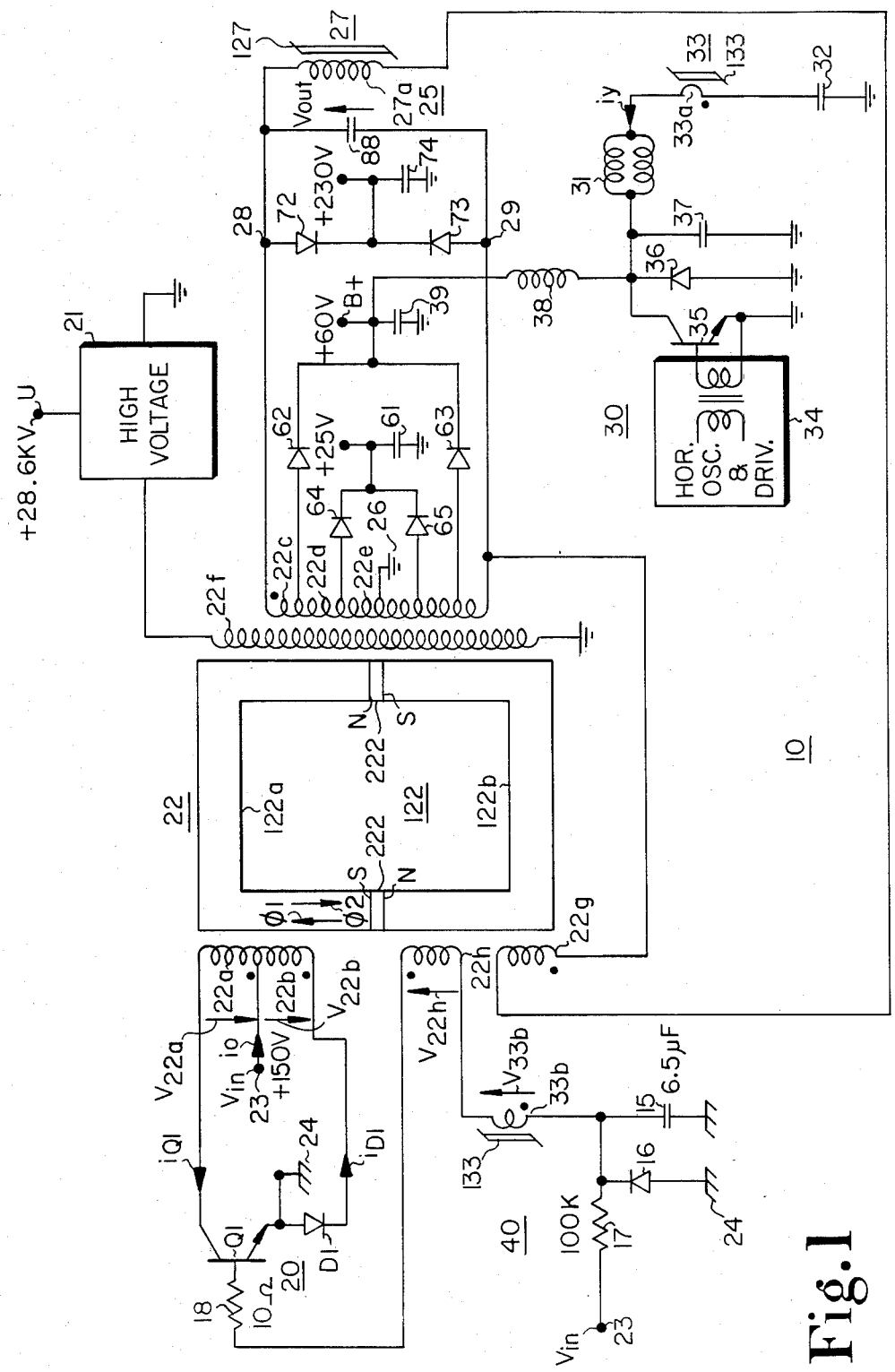

United States Patent [19]

Luz et al.

[11] Patent Number: 4,492,900

[45] Date of Patent: Jan. 8, 1985

[54] SINGLE CONTROLLABLE SWITCH, PUSH-PULL INVERTER FOR A TELEVISION RECEIVER FERRORESONANT POWER SUPPLY

[75] Inventors: David W. Luz; Donald H. Willis, both of Indianapolis, Ind.

[73] Assignee: RCA Corporation, New York, N.Y.

[21] Appl. No.: 330,363

[22] Filed: Dec. 14, 1981

[51] Int. Cl.³ .............................................. H01J 29/70
[52] U.S. Cl. ..................................... 315/411; 315/400
[58] Field of Search ................ 315/400, 411; 358/190; 336/212; 363/175

[56] References Cited

U.S. PATENT DOCUMENTS

| | | | |
|---|---|---|---|
| 4,240,013 | 12/1980 | Wedam | 315/411 |
| 4,301,394 | 11/1981 | Dietz | 315/411 X |
| 4,385,263 | 5/1983 | Luz et al. | 315/411 |
| 4,390,819 | 6/1983 | Babcock et al. | 358/190 X |
| 4,415,841 | 11/1983 | Willis et al. | 315/411 X |

*Primary Examiner*—Theodore M. Blum
*Assistant Examiner*—Brian Steinberger
*Attorney, Agent, or Firm*—Eugene M. Whitacre; Paul J. Rasmussen; Joseph J. Laks

[57] ABSTRACT

A scan synchronized push-pull power supply for a television receiver has a source of direct voltage coupled to the primary winding of a power transformer. A first controllable switch of the power supply includes a main current path and a control terminal for controlling conduction in the main path. A second switch of the power supply includes a main current path with first and second terminals thereof. The main paths of the two switches are coupled to the primary winding in a push-pull arrangement. A deflection rate signal that is synchronized with scanning current generation is applied to the control terminal of the first switch to alternately switch conduction of its main current path between conductive and nonconductive states during each deflection cycle in synchronism with the scanning current generation. The switching of the main current path of the first switch to either the conductive or nonconductive state produces a change of voltage between two main path terminals of the second switch so as to switch the conduction state of the second switch to the one that is opposite that of the first switch. The switching action of the two switches results in the development of alternating polarity voltages across the primary and secondary windings of the power transformer.

17 Claims, 2 Drawing Figures

SINGLE CONTROLLABLE SWITCH, PUSH-PULL INVERTER FOR A TELEVISION RECEIVER FERRORESONANT POWER SUPPLY

This invention relates to push-pull inverters for ferroresonant power supplies.

The power supply of a television receiver generates various direct voltages including a B+ voltage that energizes a deflection generator. To obtain relatively high efficiency and to reduce the bulk and weight of the power supply, a switching inverter operated at a high frequency may be used to excite a relatively compact power transformer. In some inverter power supplies, the transformer may also include a high voltage winding used to develop the ultor accelerating potential for the television receiver picture tube.

To regulate the output voltages developed across the power transformer secondary windings, U.S. patent application Ser. No. 144,150, filed Apr. 28, 1980, by F. S. Wendt, entitled "HIGH FREQUENCY FERRORESONANT POWER SUPPLY FOR A DEFLECTION AND HIGH VOLTAGE CIRCUIT", now U.S. Pat. No. 4,319,167, describes the use of a ferroresonant transformer as the power transformer of a television receiver high frequency inverter power supply. The ferroresonant power transformer is designed to incorporate a relatively large leakage inductance between the primary winding and each of the output secondary windings to enable regulated output voltages to be developed across the secondary windings while the voltage across the primary winding is unregulated.

In U.S. patent application Ser. No. 220,847, filed Dec. 29, 1980, by D. H. Willis, entitled "TELEVISION RECEIVER FERRORESONANT LOAD POWER SUPPLY", a ferroresonant saturable reactor arrangement is coupled across a secondary winding of a high leakage power transformer. The ferroresonant saturable reactor regulates the voltage across one of the power transformer secondary windings, thereby regulating the voltages across the other magnetically tightly coupled secondary windings.

Because of the relatively large leakage inductances that exist between the primary winding and the secondary windings of the power transformers described in the above two U.S. patent applications, an advantageous design of the inverter portion of the power supply may be that of a push-pull switch arrangement coupled to the transformer primary winding. In the U.S. patent application Ser. No. 174,943, filed Aug. 4, 1980, by D. W. Luz and D. H. Willis, entitled "TELEVISION RECEIVER, PUSH-PULL INVERTER, FERRORESONANT TRANSFORMER POWER SUPPLY SYNCHRONIZED WITH HORIZONTAL DEFLECTION", now U.S. Pat. No. 4,385,263, herein incorporated by reference, two controllable switching transistors are coupled to the power transformer primary winding and to a source of direct voltage in a push-pull arrangement. The alternate switching of the transistors produces a square-wave alternating polarity voltage across the power transformer primary winding.

As described in the aforementioned U.S. patent application Ser. No. 174,943, to operate the inverter at a high frequency in synchronism with horizontal deflection circuit scanning, the control circuit of the inverter includes a synchronizing pulse transformer having a primary winding coupled to the horizontal deflection winding. Deflection current flowing in the pulse transformer primary winding produces the magnetic saturation of the transformer magnetizable core during the entire deflection cycle, except during those intervals that encompass the zero-crossover instants of the deflection current. Near the two zero-crossover instants, the pulse transformer core comes out of saturation, thereby developing output voltages across secondary windings of the transformer. The output voltages are then applied to the inverter control circuit so as to alternately turn off the two switching transistors, one near the center of the trace interval, the other near the center of the retrace interval.

A feature of the invention is a push-pull inverter for a television receiver that requires the use of only one controllable switching element rather than the two controllable transistor elements aforedescribed in the Luz et al. application Ser. No. 174,943. Another feature of the invention is the synchronization of such a single controllable element, push-pull inverter with horizontal deflection scanning.

A power transformer has a primary winding coupled to a source of direct voltage. A first controllable switch includes a main current path and a control terminal for controlling conduction in that path. A second switch has a main current path that includes first and second main path terminals. The main paths of the two switches are coupled to the primary winding in a push-pull arrangement. A switching signal is developed and applied to the control terminal of the first switch to alternately switch conduction of its main current path between conductive and nonconductive states at a given frequency. The switching of the main current path of the first switch to either the conductive or nonconductive state produces a change of voltage between the two main path terminals of the second switch so as to switch conduction of the second switch to the state that is opposite that of the first switch. This switching action results in an alternating polarity supply voltage at the given frequency being developed across the secondary winding of the power transformer.

To scan synchronize the push-pull power supply, a deflection generator is coupled to a deflection winding for generating scanning current therein during trace and retrace intervals of each deflection cycle. The switching signal for the first controllable switch is a deflection rate signal that is synchronized with the scanning current generation. When applied to the control terminal of the first switch, the deflection rate switching signal alternately switches conduction of the first switch main current path between conductive and nonconductive states during each deflection cycle in synchronism with the scanning current generation.

Figure 2:
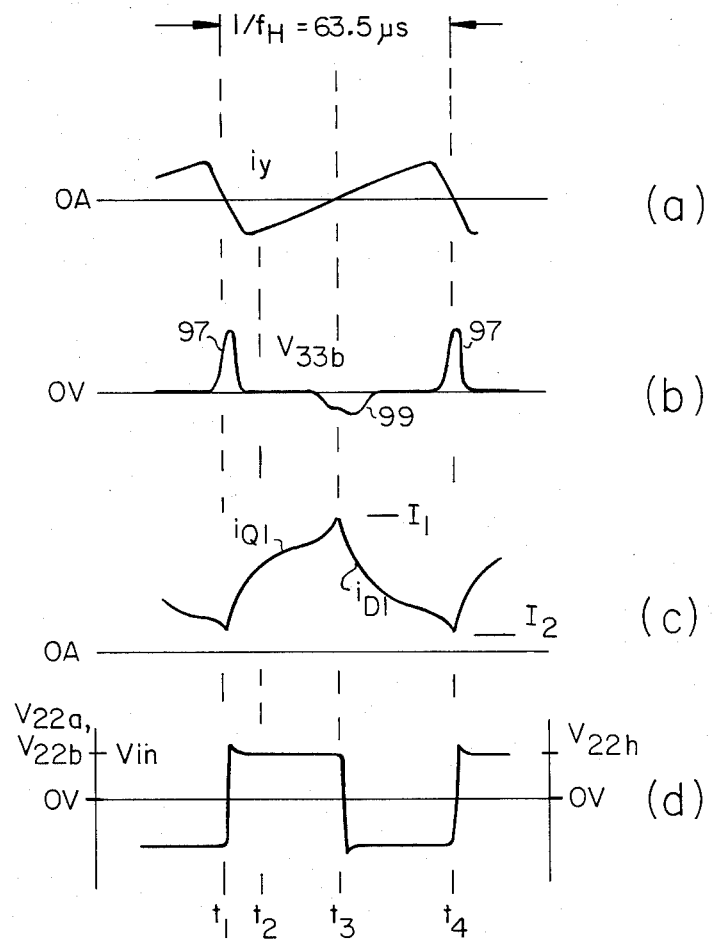

FIG. 1 illustrates a deflection synchronized inverter power supply for a television receiver embodying the invention; and FIG. 2 illustrates waveforms associated with the operation of the circuit of FIG. 1.

In the Drawing figures, the convention chosen for the direction of a voltage arrow between two terminals is such that the negative terminal is considered the reference terminal, nearest which the tail of the arrow is located.

In FIG. 1, a power supply 10 for a television receiver comprises an inverter 20 and a high leakage inductance power transformer 22. A source of unregulated voltage develops a direct voltage Vin at an input terminal 23 relative to an earth ground 24. The primary winding of power transformer 22 comprises two winding sections 22a and 22b connected together at a center tap terminal that is coupled to input terminal 23. A controllable switch, transistor Q1, has its collector electrode coupled to the terminal of primary winding section 22a that is remote from the center tap terminal and has its emitter electrode coupled to earth ground. A second switch, diode D1, has its cathode electrode coupled to the end terminal of primary winding section 22b that is remote from the center tap terminal and has its anode electrode coupled to earth ground.

The control circuit 40 of inverter 20 produces on/off switching of transistor Q1 so as to produce alternate conduction in the collector-to-emitter main current path of the transistor and in the anode-to-cathode main current path of diode D1, in a manner to be hereinafter described. The on/off switching of transistor Q1 and diode D1 develops a rectangular wave alternating polarity voltage across each of the primary winding sections 22a and 22b of power transformer 22, that in turn develop alternating polarity supply voltages of the same frequency across secondary output windings 22c–22f. Secondary windings 22c–22e have a common center tap connected to a chassis ground 26, conductively isolated from earth ground 24.

The alternating polarity output voltage developed across winding 22c is full-wave rectified by diodes 72 and 73 and filtered by a capacitor 74 to develop a direct supply voltage, of illustratively +230 volts, to power such circuits as the television receiver picture tube driver circuits. The alternating polarity output voltage developed across winding 22e is full-wave rectified by diodes 64 and 65 and filtered by a capacitor 61 to develop a direct supply voltage, of illustratively +25 volts, to power such television receiver circuits as the vertical deflection circuit, the audio circuit, and the chroma-luma circuits.

The alternating polarity output voltage developed across winding 22d is full-wave rectified by diodes 62 and 63 and filtered by a capacitor 39 to develop, at a B+ terminal, a B+ scan supply voltage to energize a horizontal deflection generator circuit 30 for developing horizontal scanning current, $i_y$, in a horizontal deflection winding 31. Horizontal deflection circuit 30 is coupled to the B+ terminal through an inductor 38 and comprises a horizontal oscillator and driver 34, a horizontal output transistor 35, a damper diode 36, a retrace capacitor 37, and the series arrangement of horizontal deflection winding 31, an S-shaping or trace capacitor 32 and a winding 33a of a saturable pulse transformer 33. Saturable pulse transformer 33 provides synchronizing pulses that establish the frequency of operation of inverter 20 at the horizontal deflection frequency and that synchronize inverter operation with the horizontal deflection or scanning current, as will be later described.

The alternating polarity output voltage developed across a high voltage winding, secondary output winding 22f, is coupled to a high voltage circuit 21 to develop an ultor voltage or accelerating potential at a terminal U for the television receiver picture tube, not illustrated. High voltage circuit 21 may comprise a conventional voltage multiplier circuit of the Cockroft-Walton type, or may comprise a half-wave rectifier arrangement with a plurality of diodes integrally molded as a single unit with a plurality of winding sections of winding 22f, the winding sections of winding 22f not being individually illustrated in FIG. 1.

The output voltage Vout developed across secondary output winding 22c, between terminals 28 and 29, is regulated by the ferroresonant operation of a ferroresonant load circuit 25, as described in the aforementioned Willis U.S. patent application and in U.S. patent application Ser. No. 255,396, filed Apr. 20, 1981, by D. H. Willis, entitled "TELEVISION RECEIVER FERRORESONANT LOAD POWER SUPPLY WITH REDUCED SATURABLE REACTOR CIRCULATING CURRENT", now U.S. Pat. No. 4,353,014, both applications herein incorporated by reference. Ferroresonant load circuit 25 comprises a saturable reactor 27 including a magnetizable core 127 and a winding 27a located thereon, a capacitor 88 coupled between terminal 28 and 29 and a winding 22g of transformer 22 magnetically tightly coupled to winding sections 22a and 22b and conductively coupled in series with saturable reactor winding 27a across capacitor 88.

By being coupled to transformer secondary output winding 22c, ferroresonant load circuit 25 acts as a regulating load circuit to maintain the voltage across winding 22c as the regulated voltage Vout. With the voltage across secondary output winding 22c regulated by the ferroresonant operation of ferroresonant load circuit 25, the output voltages across all the other secondary windings that are tightly coupled to winding 22c, including high voltage winding 22f, are also regulated. Because of the loose magnetic coupling between each of the primary winding sections 22a and 22b, and each of the secondary windings 22c–22f, the voltage across the secondary windings can remain relatively unchanged in amplitude or half-cycle area, even though the voltages across the primary winding sections vary in amplitude.

Transformer 22, in combination with capacitor 88, develops an exciting current in saturable reactor winding 27a. The exciting current generates a combined magnetic flux in core 127 that links winding 27a to produce the alternating polarity output voltage Vout. To regulate Vout by ferroresonant operation, capacitor 88 generates a circulating current during each half cycle of the alternating polarity output voltage that aids in magnetically saturating the core section of magnetizable core 127 that is associated with the reactor winding.

As the saturable core section goes into saturation and comes out of saturation, the inductance exhibited by saturable reactor winding 27a switches between a low inductance and a high inductance. This switching action is a function of the saturation characteristics of the magnetizable material of core 127. The amplitude of the output voltage, the half-cycle area of the output voltage, or both the amplitude and half-cycle area are regulated by the switching action of winding 27a against changes in the amplitude of the input voltage Vin and against changes in the loading on the various power transformer secondary winding supply terminals including the ultor supply terminal U.

The control circuit 40 for inverter 20 includes a feedback winding 22h of power transformer 22, tightly coupled magnetically to primary winding sections 22a and 22b. The dotted terminal of winding 22h is coupled to the base of switching transistor Q1 through a resistor 18; the undotted terminal is coupled to the undotted terminal of a secondary winding 33b of synchronizing pulse transformer 33. The dotted terminal of pulse transformer secondary winding 33b is coupled to the cathode electrode of a diode 16; the anode electrode of diode 16 is coupled to earth ground. A capacitor 15 is coupled between the two electrode terminals of diode 16. A start-up resistor 17 is coupled between input terminal 23 and the junction of diode 16 and pulse transformer secondary winding 33b.

The algebraic sum of the voltage V33b being developed across pulse transformer secondary winding 33b, and the voltage V22h being developed across power transformer feedback winding 22h, is applied to the base control terminal of switching transistor Q1 through resistor 18 and the parallel combination of diode 16 and capacitor 15.

Consider operation of inverter 20 during synchronized operation, near the instant $t_2$ within the trace interval of the horizontal scanning current $i_y$ of FIG. 2a. Near time $t_2$, the magnitude of the horizontal scanning current $i_y$ is sufficiently great to maintain the core 133 of pulse transformer 33 in magnetic saturation, resulting in zero signal voltage V33b being developed, as illustrated in FIG. 2b.

Switching transistor Q1 is in saturated conduction near time $t_2$, as illustrated in FIG. 2d, by the primary winding section voltage V22a being a positive voltage of magnitude Vin. Forward base drive voltage for the switching transistor is being provided by the feedback winding voltage V22h, also illustrated in FIG. 2d as the same voltage waveform, but at a different amplitude scale. Forward base current flows from ground 24, through diode 16, windings 33b and 22h, resistor 18 to the base electrode of transistor Q1.

Input current $i_0$ flows from terminal 23 to winding section 22a as a positive or forward collector current $i_{Q1}$, illustrated in FIG. 2c between times $t_1$–$t_3$. The input current $i_0$ during the conduction time of transistor Q1 is a generally increasing ramp current waveform.

At some time prior to the center of the horizontal trace interval, prior to time $t_3$ of FIG. 2b, the scanning current $i_y$ has decreased sufficiently in magnitude to enable the pulse transformer core 133 to come out of magnetic saturation to produce a negative signal pulse voltage 99 across pulse transformer secondary winding 33b of a duration that encompasses the trace zero-crossover instant $t_3$. The negative voltage pulse 99 is of sufficient amplitude, that when it is algebraically combined with the feedback drive voltage V22h, a negative or reverse biasing voltage is applied to the base of switching transistor Q1. The reverse biasing voltage generates a reverse base current in transistor Q1 that flows from the base of transistor Q1 through resistor 18, windings 22h and 33b, capacitor 15 to the emitter of transistor Q1. Near time $t_3$, forward collector current conduction in transistor Q1 is cut off, producing a reversal in the power transformer voltages V22a, V22b and V22h, as illustrated in FIG. 2d after time $t_3$.

As the voltage V22b across primary winding section 22b reverses in polarity, the dotted terminal of that winding section becomes sufficiently negative to forward bias output switching diode D1, as illustrated in FIG. 2d by the negative voltage portion of V22b being of a magnitude equal to that of Vin. With diode D1 conducting and the voltage V22b of primary winding section 22b negative, the input current $i_0$ comprises the diode current waveform $i_{D1}$ of FIG. 2c between times $t_3$–$t_4$, but of opposite polarity to that shown for $i_{D1}$. Thus, the diode D1 conducts a return current back to terminal 23 into the input voltage source, thereby returning to the input voltage source energy stored in the magnetic field of the core 122 of power transformer 22.

As illustrated in FIG. 2c, the current $i_{D1}$ is a positive, but downwardly sloping ramp current waveform having a peak magnitude $I_1$ at time $t_3$ equal to the peak magnitude of the collector current $i_{Q1}$.

At some time prior to the center of the horizontal retrace interval, prior to time $t_4$ of FIGS. 2a and 2b, the horizontal scanning current $i_y$ has decreased sufficiently in magnitude to again bring the core 133 of pulse transformer 33 out of magnetic saturation, thereby producing the signal voltage pulse 97 having a pulse duration that encompasses the retrace zero-crossover instant $t_4$. The positive signal voltage pulse 97 is of sufficient amplitude that when algebraically combined with the feedback drive voltage V22h provides a forward biasing voltage for switching transistor Q1 to switch the transistor into conduction, as illustrated by the voltage V22a becoming positive after time $t_4$ or time $t_1$. The input current $i_0$ after time $t_1$ now flows as the forward collector current $i_{Q1}$, previously discussed.

As the transistor Q1 starts conducting, near time $t_1$ of FIGS. 2c and 2d, the collector electrode voltage begins to approach zero, inducing a polarity voltage reversal across primary winding sections 22a and 22b and feedback drive winding 22h. The voltage at the dotted terminal of primary winding section 22b increases sufficiently to apply a reverse biasing voltage to diode D1. When this reverse biasing voltage is applied, a negative current spike is generated in diode $i_{D1}$ to sweep out the stored charge in the diode PN junction. This negative current spike flows in primary winding section 22b and is transformer reflected into primary winding section 22a to produce a positive current spike in the collector current $i_{Q1}$. Neither the negative diode current spike nor the positive collector current spike near time $t_1$ or $t_4$ is illustrated in FIG. 2c. With transistor Q1 again switched into conduction after time $t_1$, a positive voltage is developed across primary winding section 22a, producing the upwardly ramping collector current $i_{Q1}$ of FIG. 2c, having a minimum current magnitude $I_2$ at time $t_1$, equal to the minimum current magnitude of the diode current $i_{D1}$.

The alternate switching of transistor Q1 by the synchronizing pulse voltage V33b produces an alternating polarity, square-wave voltage of substantially 50% duty cycle across primary winding sections 22a and 22b that is in synchronism with the horizontal scanning current $i_y$.

During a start-up interval, after the television receiver is first energized, inverter 20, in the absence of horizontal scanning current generation, operates in a free-running mode due to the positive feedback being provided by power transformer winding 22h. To initiate the switching action of transistor Q1 at the beginning of the start-up interval, current flows from terminal 23 through start-up resistor 17 to charge capacitor 15 positive at the plate remote from earth ground. When capacitor 15 has charged sufficiently positive, transistor Q1 is forward biased into conduction, to commence free-running inverter operation. To enable subsequent synchronization of inverter 20 with horizontal scanning current generation, the free-running frequency of the inverter is selected between 5 and 10 KHz, a frequency lower than the horizontal deflection frequency, $f_H$, as described in the aforementioned U.S. patent application of Luz et al., Ser. No. 174,943.

The core 122 of high leakage transformer 22 comprises two U-core pieces 122a and 122b and butted or placed against one another to form a generally rectangularly shaped core, having opposing vertical and horizontal legs. Spacers 222 separate the opposing faces of core pieces 122a and 122b to provide gaps in the vertical legs of the core 122. To provide the loose magnetic coupling between each of primary winding sections 22a and 22b and each of the secondary windings 22c–22f, the primary winding sections are wound around one vertical leg of core 122 while the secondary windings are wound around the other vertical leg. Windings 22g and 22h, tightly coupled magnetically to primary winding sections 22a and 22b, are wound around the same vertical leg as are the primary winding sections.

By inspection of the current waveform FIG. 2c, one notes that current in primary winding sections 22a and 22b always flows in one direction, that is, into the respective dotted terminals of the primary winding sections. The magnetizing current components of the current in the two primary winding sections generates a magnetic flux in the core 122 that flows substantially in just one direction, illustratively the direction of the arrow $\emptyset 1$ of FIG. 1. This unidirectional flux, generated by the magnetizing current flowing in primary winding sections 22a and 22b, produces a magnetic biasing of core 122 such that its operating point is located in the first quadrant of the corresponding B-H characteristic curve of the core material, at some point away from the (0,0) coordinate point.

The design of transformer 22 must take into account the core magnetic biasing introduced during operation of inverter 20. The peak current $I_1$ flowing in primary winding section 22a or 22b at time $t_3$ of FIG. 2c should not result in core 122 being near magnetic saturation. If the core were brought near magnetic saturation, the current in transistor Q1 could become excessive due to the reduced inductance thereby exhibited by winding 22a.

One way of assuring that the maximum flux level attained in core 122 does not approach magnetic saturation is by increasing the cross-sectional area of the vertical leg around which primary winding sections 22a and 22b are wound to the point that the maximum flux density level in that leg is well below the knee of the B-H curve characteristic of the core material.

Another way of assuring that excessive collector currents in transistor Q1 are not generated is to provide a magnetic pre-bias to core 122 which opposes the bias introduced during operation of inverter 20. As illustrated in FIG. 1, the pre-bias may be introduced by constructing spacers 222 out of a magnetizable material that has been permanently magnetized, such as out of a magnetized hard ferrite like barium ferrite.

With permanent magnets 222 having their poles oriented as illustrated in FIG. 1, a magnetic flux is introduced in core 122 by the permanent magnets that flows in the direction of the arrow $\emptyset 2$. This pre-biasing flux is in a direction that is opposite the direction of the arrow $\emptyset 1$, the direction of the flux introduced by operation of inverter 20. By the proper selection of the strength of permanent magnets 222, operation of inverter 20 will not bring the flux density levels in core 122 near or beyond the knee of the B-H curve characteristic of the core material.

To avoid demagnetization of the permanent magnets during normal operation of inverter 20, the permanent magnet material may be selected to exhibit relatively large coercivity and large retentivity.

Another way of avoiding the demagnetization of the permanent magnet material is to design the U-shaped core pieces 122a and 122b of FIG. 1 with faces cut at 45° or 60° to the horizontal. The permanent magnet spacers 222 are then designed to contact the core piece faces in a flush manner.

What is claimed is:

1. A scan synchronized push-pull power supply for a television display system, comprising:
   a deflection winding;
   a deflection generator coupled to said deflection winding for generating scanning current in said deflection winding during trace and retrace intervals of each deflection cycle;
   a source of direct voltage;
   a power transformer having a primary winding wound around a portion of a magnetizable core and coupled to said direct voltage source and having a secondary winding;
   a first controllable switch having a main current path and a control terminal for controlling conduction in said main current path;
   a second switch having a main current path including first and second main current path terminals, the main current path of said first controllable switch being coupled to a first winding section of said primary winding to generate only a unidirectional current therein, the main current path of said second switch being coupled to a second winding section of said primary winding to generate only a unidirectional current therein, the main current paths of the two switches being coupled to the two winding sections of said primary winding in a push-pull arrangement;
   means for developing a deflection rate signal that is synchronized with scanning current generation;
   means for applying said deflection rate signal to the control terminal of said first switch to alternately switch conduction of said main current path of said first switch between conductive and nonconductive states during each deflection cycle in synchronism with scanning current generation, the switching of the main current path of said first switch to either the conductive or nonconductive state producing a change of voltage between the two main current path terminals of said second switch that switches the conduction state of the main current path of the second switch to the one that is opposite that of the main current path of the first switch, resulting in the development of an alternating polarity output voltage across said transformer secondary winding; and
   a load circuit within said television display system energized by said output voltage.

2. A power supply according to claim 1 wherein said first switch comprises a transistor arrangement and wherein said second switch comprises a diode.

3. A power supply according to claim 2 wherein said power transformer includes a feedback winding coupled to said transistor arrangement to provide the forward biasing thereof after the main current path of said transistor arrangement is switched to the conductive state.

4. A power supply according to claims 1 or 3 including means for producing a DC bias magnetic flux in the portion of the core of said power transformer around which said primary winding is wound to oppose the biasing of said portion that is produced by said push-pull arrangement during operation of said push-pull arrangement.

5. A power supply according to claim 4 wherein said bias magnetic flux producing means comprises a permanent magnet.

6. A power supply according to claims 1, 2 or 3 wherein said deflection rate signal developing means comprises a signal transformer having a primary winding with scanning current flowing therein for developing thereacross said deflection rate signal, and wherein said deflection rate signal applying means includes a secondary winding of said signal transformer.

7. A power supply according to claim 6 wherein said power transformer feedback winding is coupled to said signal transformer secondary winding so as to apply to said control terminal the algebraic sum of the voltages developed across the last two mentioned windings.

8. A power supply according to claim 7 including means for producing a bias magnetic flux in the core of said power transformer that opposes the biasing produced during operation of said push-pull arrangement.

9. A power supply according to claim 8 wherein said bias magnetic flux producing means comprises a permanent magnet.

10. A power supply according to claim 1 wherein said power transformer comprises a high leakage transformer with said power transformer secondary winding being loosely coupled magnetically to said power transformer primary winding and wherein said power supply includes a ferroresonant saturable reactor circuit coupled to said power transformer secondary winding for regulating said output voltage by the ferroresonant operation of said saturable reactor circuit.

11. A power supply according to claim 10 including means for producing a bias magnetic flux the core of said power transformer that opposes the bias produced during operation of said push-pull arrangement.

12. An inverter power supply, comprising:
a source of direct voltage;
a power transformer having a primary winding wound around a portion of a magnetizeable core and coupled to said direct voltage source and having a secondary winding suitable for coupling to a load circuit;
a first controllable switch having a main current path and a control terminal for controlling conduction in said main current path;
a second switch having a main current path including first and second main current path terminals, the main current path of said first controllable switch being coupled to a first winding section of said primary winding to generate only a unidirectional current therein, the main current path of said second switch being coupled to a second winding section of said primary winding to generate only a unidirectional current therein, the main current paths of the two switches being coupled to the two winding sections of said primary winding in a push-pull arrangement;
control means responsive to a switching signal and coupled to the control terminal of said first switch to alternately switch conduction of said main current path of said first switch between conductive and nonconductive states at a given frequency determined by said switching signal, the switching of the main current path of said first switch to either the conductive or nonconductive state producing a change of voltage between the two main current path terminals of said second switch that switches the conduction of the main current path of the second switch to the state that is opposite that of the main current path of the first switch, to develop an alternating polarity voltage of said given frequency across said transformer primary winding.

13. An inverter power supply, comprising:
a source of direct voltage;
a power transformer having a primary winding wound around a portion of a magnetizeable core and coupled to said direct voltage source and having a secondary winding suitable for coupling to a load circuit;
a first controllable switch having a main current path and a control terminal for controlling conduction in said main current path;
a second switch having a main current path including first and second main current path terminals, the main current paths of the two switches being coupled to said primary winding in a push-pull arrangement;
control means responsive to a switching signal and coupled to the control terminal of said first switch to alternately switch conduction of said main current path of said first switch between conductive and nonconductive states at a given frequency determined by said switching signal, the switching of the main current path of said first switch to either the conductive or nonconductive state producing a change of voltage between the two main current path terminals of said second switch that switches the conduction of the main current path of the second switch to the state that is opposite that of the main current path of the first switch, to develop an alternating polarity voltage of said given frequency across said transformer primary winding, operation of said inverter power supply producing a magnetic biasing of said core; and
a permanent magnet arrangement located adjacent said magnetizable core so as to introduce a bias magnetic flux that opposes the aforementioned magnetic biasing.

14. A power supply according to claim 13 wherein said core comprises two U-shape core pieces butted against each other at the respective faces of the pieces, said permanent magnet arrangement spacing apart a face of one piece from the corresponding face of the other piece.

15. A power supply according to claim 13 wherein said core comprises a rectangularly shaped core having said primary winding wound around one leg thereof, said leg having a gap into which a permanent magnet is placed.

16. A television display system incorporating the power supply defined by claims 12 or 13 including a deflection winding, a deflection generator coupled to said deflection winding for generating scanning current in said deflection winding during trace and retrace intervals of each deflection cycle, means for developing a deflection rate signal that is synchronized with scanning current generation, and means for applying said deflection rate signal to said first switch control terminal as said switching signal to develop said alternating polarity voltage across said transformer primary winding in synchronism with scanning current generation.

17. A power supply according to claim 12 wherein said secondary winding is loosely coupled magnetically to said primary winding and including means for producing a DC bias magnetic flux in the portion of the core of said power transformer around which said primary winding is wound to oppose the biasing of said portion that is produced by said push-pull arrangement during operation of said push-pull arrangement.

* * * * *